United States Patent
Hosoi et al.

(10) Patent No.: US 10,510,371 B1
(45) Date of Patent: Dec. 17, 2019

(54) THERMALLY-ASSISTED MAGNETIC RECORDING HEAD HAVING SUB-MOUNT WITH BARRIER-MEMBERS SANDWICH A HEATER

(71) Applicant: SAE Magnetics (H.K.) Ltd., Hong Kong (HK)

(72) Inventors: Ryo Hosoi, Hong Kong (HK); Takashi Honda, Hong Kong (HK); Seiichi Takayama, Hong Kong (HK)

(73) Assignee: SAE Magnetics (H.K.) Ltd., Hong Kong (HK)

( * ) Notice: Subject to any disclaimer, the term of this patent is extended or adjusted under 35 U.S.C. 154(b) by 0 days.

(21) Appl. No.: 16/282,383

(22) Filed: Feb. 22, 2019

(51) Int. Cl.
| | |
|---|---|
| *G11B 11/105* | (2006.01) |
| *G11B 13/08* | (2006.01) |
| *G11B 5/00* | (2006.01) |
| *G11B 5/31* | (2006.01) |
| *G11B 5/60* | (2006.01) |

(52) U.S. Cl.
CPC .............. *G11B 13/08* (2013.01); *G11B 5/314* (2013.01); *G11B 5/6088* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 8,462,462 B1 * | 6/2013 | Moravec | G11B 5/4826 360/125.31 |
| 8,675,455 B1 * | 3/2014 | Krichevsky | G11B 5/3133 360/59 |
| 8,917,581 B1 * | 12/2014 | Mallary | G11B 5/314 369/13.33 |
| 10,026,421 B1 * | 7/2018 | Barbosa Neira | G11B 5/1871 |
| 2010/0238581 A1 * | 9/2010 | Nakamura | G11B 5/4833 360/59 |
| 2011/0205661 A1 | 8/2011 | Komura et al. | |
| 2012/0044967 A1 * | 2/2012 | Cole | G11B 5/105 372/92 |
| 2012/0155232 A1 | 6/2012 | Schreck et al. | |
| 2015/0154988 A1 | 6/2015 | Takei et al. | |
| 2015/0340053 A1 * | 11/2015 | Peng | G11B 5/314 369/13.33 |
| 2015/0364899 A1 | 12/2015 | Tatah et al. | |
| 2015/0380035 A1 | 12/2015 | Takei et al. | |

FOREIGN PATENT DOCUMENTS

JP 2012084216 A 4/2012

* cited by examiner

*Primary Examiner* — Tan X Dinh

(57) ABSTRACT

A light source-unit comprises a laser diode, a sub-mount which the laser diode is joined, and a heater which is joined on a joint surface of the sub-mount. The sub-mount comprises a pair of barrier-members. The barrier-members are formed with lower thermal conductivity material which thermal conductivity is lower than joining metal which is used for joining the laser diode and the sub-mount. The barrier-members are formed on the joint surface so as to sandwich the heater.

13 Claims, 20 Drawing Sheets

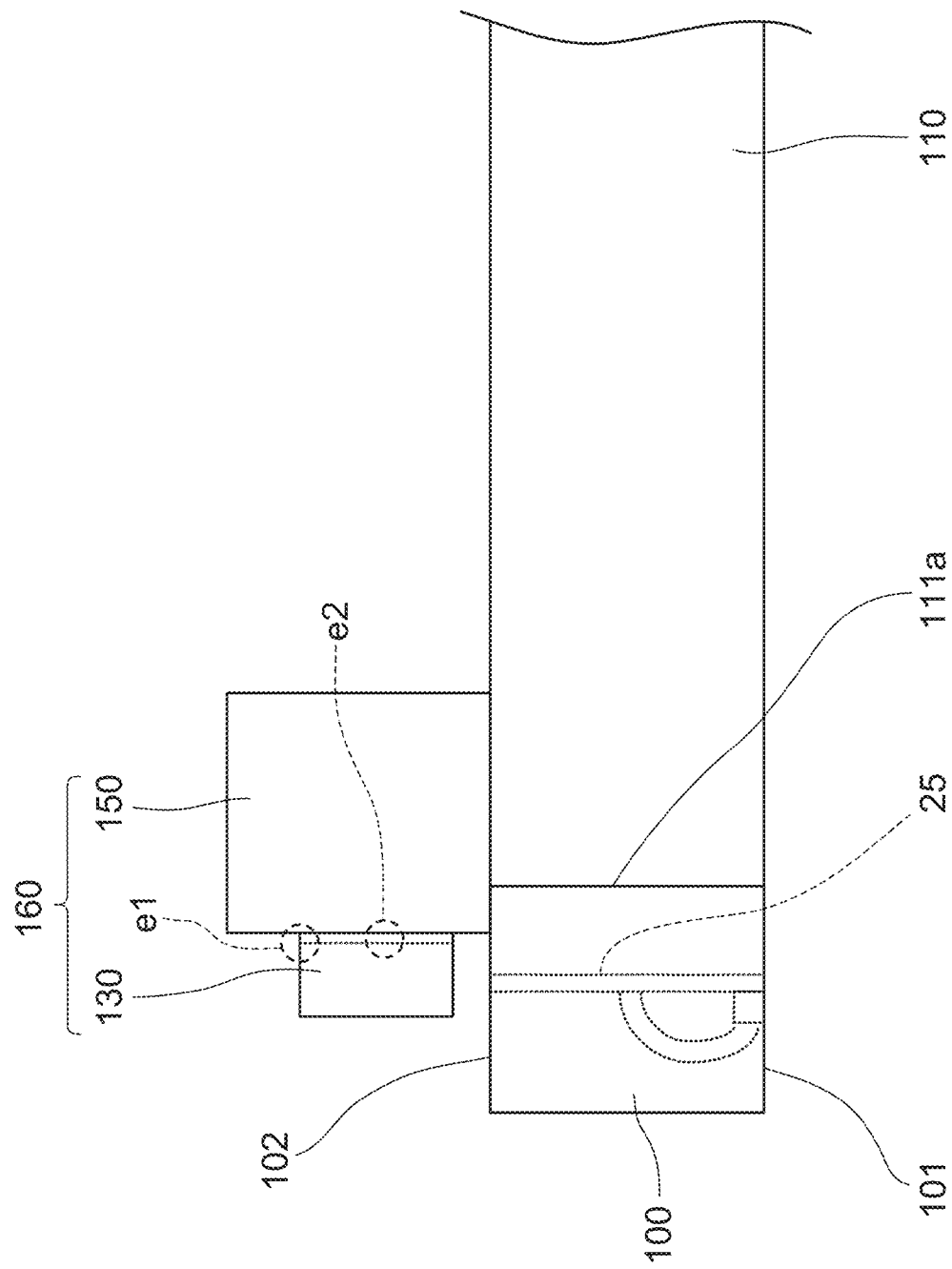

THERMALLY-ASSISTED MAGNETIC RECORDING HEAD HAVING SUB-MOUNT WITH BARRIER-MEMBERS SANDWICH A HEATER

BACKGROUND

Field of the Invention

The present invention relates to a light source-unit, which is used for a thermally assisted magnetic head recording data on a magnetic recording medium by thermally assisted magnetic recording using near-field light, the thermally assisted magnetic head, a head gimbal assembly and a hard disk drive each having the thermally assisted magnetic head.

Related Background Art

In recent years, as magnetic disk drives have been increasing their recording densities, thin-film magnetic heads recording data on a magnetic recording media have been required to further improve their performances. As the thin-film magnetic heads, those of composite type having a structure in which a reproducing head having a magnetoresistive device (hereinafter, referred to also as an "MR device") for read and a recording head having an electromagnetic coil device for write are laminated have been conventionally in wide use. In a magnetic disk drive, the thin-film magnetic head is provided on a slider which very slightly floats from the magnetic recording medium.

Incidentally, the magnetic disk drive records data by magnetizing magnetic fine particles on the magnetic recording medium using the recording head. In order to increase the recording density of the magnetic recording medium, it is effective to make the magnetic fine particles smaller.

When the magnetic fine particles are made smaller, however, there arises a problem that the magnetization thereof becomes unstable with respect to heat as the particles reduce in volume, thereby increasing the possibility that the data recorded on the magnetic recording medium is lost. To solve the problem, it is effective to increase the magnetic energy of the magnetic fine particles to thereby enhance the stability of magnetization. When the magnetic energy of the magnetic fine particles is increased, however, there arises another problem that the coercive force (difficulty in reversing magnetization) of the magnetic recording medium increases to deteriorate the data recording performance.

To solve such problems, a method called thermally assisted magnetic recording has been conventionally proposed. When recording data on a magnetic recording medium having a large coercive force, the thin-film magnetic head employing the thermally assisted magnetic recording (hereinafter, referred to as a "thermally assisted magnetic head") records data while instantaneously heating and thereby increasing the temperature of a portion of the magnetic recording medium where data will be recorded.

Since the magnetic fine particles decrease in coercive force when the temperature is increased, instantaneous heating makes it possible to record data even on the magnetic recording medium having a high coercive force at room temperature. The portion of the magnetic recording medium where the data has been recorded is decreased in temperature after the recording of data and thereby increases in coercive force. Therefore, by using the thermally assisted magnetic head, it becomes possible to make the magnetic fine particles finer as well as stabilize recording in the magnetic disk drive.

On the other hand, near-field light is used as means for heating the magnetic recording medium in the conventional thermally assisted magnetic head. When light enters an opening smaller than the wavelength of light, the light slightly seeps from the opening and locally exists near the opening. The light locally existing near the opening is called near-field light. The near-field light is confined in a region much smaller than that of a spot light obtained by collecting light using a lens, so that use of the near-field light makes it possible to heat only a limited extremely small recording region of the magnetic recording medium. A conventional technology concerning the thermally assisted magnetic recording is disclosed in, for example, US 2012-0155232 (also called patent document 1).

By the way, in the thermally assisted magnetic head, because the recording head is formed on the slider, the structure, which laser light for generating the near-field light is guided to the medium-opposing surface of the slider, is important. The following structure is conventionally known as the structure.

The structure which the light source is provided on the surface of the slider (for example, US2015-0364899 (also called patent document 2), US2011-0205661 (also called patent document 3), US2015-154988 (also called patent document 4), US 2015-0380035 (also called patent document 5), JP2012-084216 (also called patent document 6)).

SUMMARY OF THE INVENTION

There is a following problem in the thermally assisted magnetic head, having the above-described conventional structure. The problem is caused by optical feedback of a laser diode.

When laser light is emitted from the laser diode as the light source, part of laser light is reflected on the surface of the slider (entrance of the waveguide), after that, the reflected light returns to the laser diode as optical feedback.

In this case, standing wave conditions collapse by mixing optical feedback, in the laser diode, unstable action, which is called "mode hopping", which oscillation wavelength change suddenly, is caused. Thereby, optical output of the laser diode become unstable. Then, a recording characteristic of the thermally assisted magnetic head becomes unstable.

It is conventionally known that the mode hopping occurs when a temperature change happens. Here, FIG. 17 is a graph showing a change of optical output to a temperature change of environment, in the condition that constant current flows in the laser diode. Temperature of environment is changed by a heater. As illustrated in FIG. 17, for example, the mode hopping occurs at the parts which optical output change suddenly (sudden-change parts mh1, mh2, mh3).

In the interval between adjacent mode hoppings, for example, mode hopping which occurs at the sudden-change part mh1 and mode hopping which occurs at the sudden-change part mh2, as illustrated in FIG. 17, optical output change continuously. Besides, in this interval, recording quality, by the thermally assisted magnetic head, is stable comparatively. Then, the intervals between adjacent mode hoppings are suitable, in point of mode hopping restraint, continuous change of optical output, stabilizing recording quality.

Therefore, it is preferable that temperature-conditioning by the heater is performed so that temperature of environment is kept between adjacent mode hoppings (namely, the interval between the adjacent sudden-change parts, referred also to as, mode hopping interval, "mh interval").

However, when current flows through the laser diode, a temperature of a stripe electrode rises because of self-heating of the laser diode. When the temperature of the stripe electrode rises, the temperature of environment changes. It means existence of another heat source with the heater, therefore it is difficult that temperature of environment is kept in the mh interval.

On the other hand, in the thermally assisted magnetic recording, optical output of the laser diode is lowered at the timing of recording for servo-data, to avoid servo-data erasing.

In the hard disk drive, as illustrated in FIG. 18(*a*), data and servo-data are respectively recorded on every sector, such as sector1, sector2, sector3. As illustrated in FIG. 18(*b*), sectors, including from N1 to N2(N1, N2 are natural numbers, N1<N2), are formed in the hard disk. When servo-data is recorded, optical output is lowered. Therefore, as illustrated in FIG. 18(*a*), the temperature of the stripe electrode moves up and down frequently.

Therefore, it is required that responsiveness of the temperature-conditioning by the heater is improved, thereby the temperature-conditioning becomes responsive to temperature change of the stripe electrode.

Hence the present invention is made to solve the above problem, and it is an object to improve responsiveness of the temperature-conditioning by the heater so that the temperature-conditioning by the heater is responsive for temperature change of the stripe electrode, in the light source-unit, thermally assisted magnetic head having the light source-unit, the head gimbal assembly and the hard disk drive.

To solve the above problem, the present invention is a light source-unit which is used for a thermally assisted magnetic head including: a laser diode; a sub-mount which the laser diode is joined; and a heater which is joined on a joint surface, of the sub-mount, which the laser diode is joined; the sub-mount includes a pair of barrier-members, the barrier-members are formed with lower thermal conductivity material which thermal conductivity is lower than joining metal which is used for joining the laser diode and the sub-mount, the barrier-members are formed on the joint surface so as to sandwich the heater.

In case of the above-described light source-unit, it is possible that the heater is formed in a straight band-like shape and the barrier-members are formed in a straight band-like shape, the barrier-members are formed so as to sandwich the heater from the both sides along with length direction.

Further, it is possible that the barrier-members have thickness larger than the thickness of the heater.

Furthermore, it is possible that laser diode has a stripe electrode being formed in a straight band-like shape, the heater and barrier-members are arranged on the joint surface along with the length direction of the stripe electrode.

It is possible that the light source-unit further including: a joining metal layer made of joining metal, the joining metal layer is formed so as to be in contact with the surface of the heater between the barrier-members.

Further, it is possible that the laser diode has an opposing-surface which opposes to the joint-surface, the heater and barrier-members are arranged in a light-source area, of the joint-surface, which opposes to the opposing-surface.

Further, it is possible that the barrier-members have the same size, with a heater length along with the length direction of the heater, or the longer size than the heater length.

It is possible that the barrier-members have flat upper-surfaces which are formed in a flat shape along with the joint-surface.

It is possible that the joint-surface is formed with the lower thermal conductivity material.

Further, the present invention provides a thermally assisted magnetic head including: a slider; and a light source-unit joined to the slider, the light source-unit includes a laser diode, a sub-mount which the laser diode is joined, and a heater which is joined on a joint surface, of the sub-mount, which the laser diode is joined; the sub-mount comprises a pair of barrier-members, the barrier-members are formed with lower thermal conductivity material which thermal conductivity is lower than joining metal which is used for joining the laser diode and the sub-mount, the barrier-members are formed on the joint surface so as to sandwich the heater.

In case of the above-described thermally assisted magnetic head, it is possible that the heater is formed in a straight band-like shape and the barrier-members are formed in a straight band-like shape, the barrier-members are formed so as to sandwich the heater from the both sides along with length direction.

Further, the present invention provides a head gimbal assembly including a thermally assisted magnetic head, the thermally assisted magnetic head including: a slider; and a light source-unit joined to the slider, the light source-unit includes a laser diode, a sub-mount which the laser diode is joined, and a heater which is joined on a joint surface, of the sub-mount, which the laser diode is joined, the sub-mount includes a pair of barrier-members, the barrier-members are formed with lower thermal conductivity material which thermal conductivity is lower than joining metal which is used for joining the laser diode and the sub-mount, the barrier-members are formed on the joint surface so as to sandwich the heater.

Then, the present invention provides a hard disk drive including a head gimbal assembly having a thermally assisted magnetic head, and a magnetic recording medium opposing the thermally assisted magnetic head, the thermally assisted magnetic head including: a slider; and a light source-unit joined to the slider, the light source-unit includes a laser diode, a sub-mount which the laser diode is joined; and a heater which is joined on a joint surface, of the sub-mount, which the laser diode is joined the sub-mount includes a pair of barrier-members, the barrier-members are formed with lower thermal conductivity material which thermal conductivity is lower than joining metal which is used for joining the laser diode and the sub-mount, the barrier-members are formed on the joint surface so as to sandwich the heater.

The present invention will be more fully understood from the detailed description given hereinbelow and the accompanying drawings which are given by way of illustration only, and thus are not to be considered as limiting the present invention.

BRIEF DESCRIPTION OF THE DRAWINGS

FIG. 14 is a side view, partially omitted, showing the thermally assisted magnetic head;

DETAILED DESCRIPTION OF THE EMBODIMENTS

In the following, embodiments of the present invention will be described with reference to the drawings. Note that the same components will be referred to with the same numerals or letters, while omitting their overlapping descriptions.

(Structure of the Thermally Assisted Magnetic Head)

Figure 1:
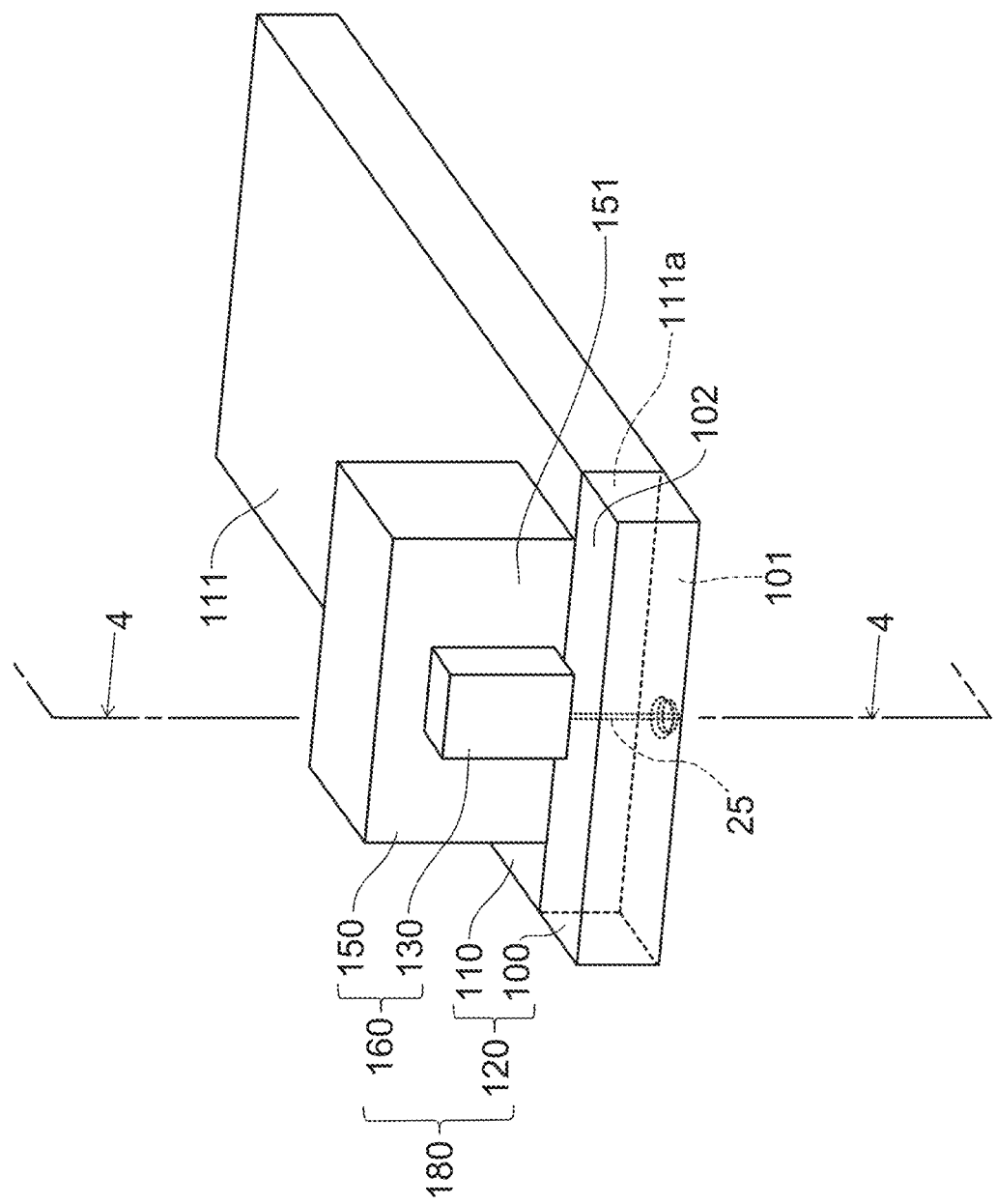
FIG. 1 is a perspective view of the thermally assisted magnetic head according to an embodiment of the present invention.
Figure 2:
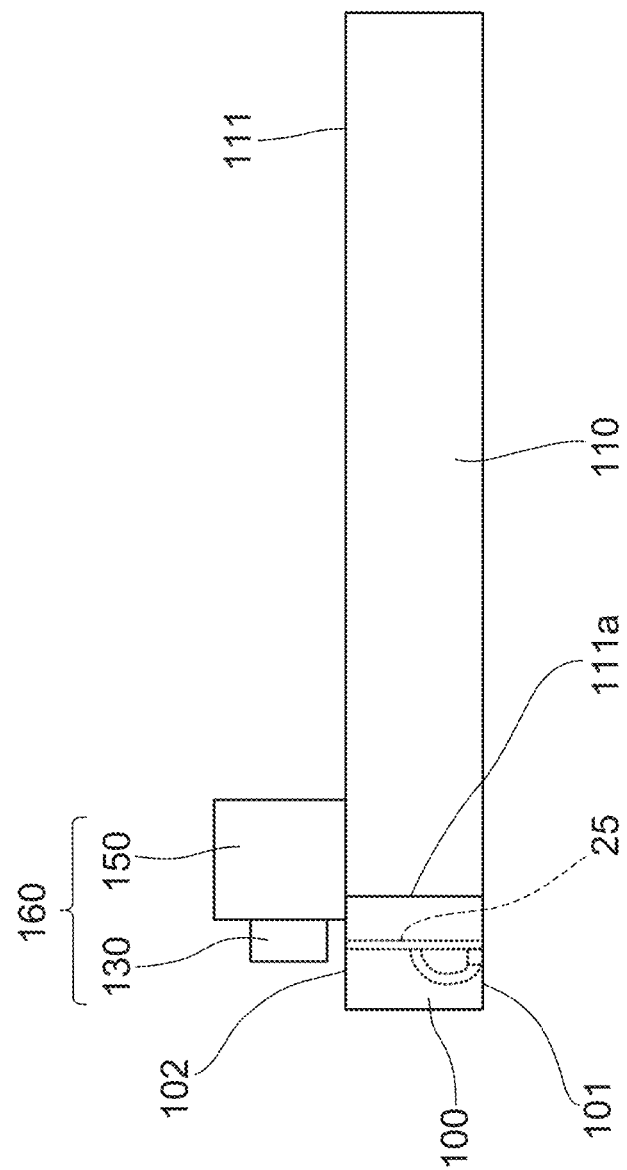
FIG. 2 is a side view of the thermally assisted magnetic head according to the embodiment of the present invention.
Figure 3:
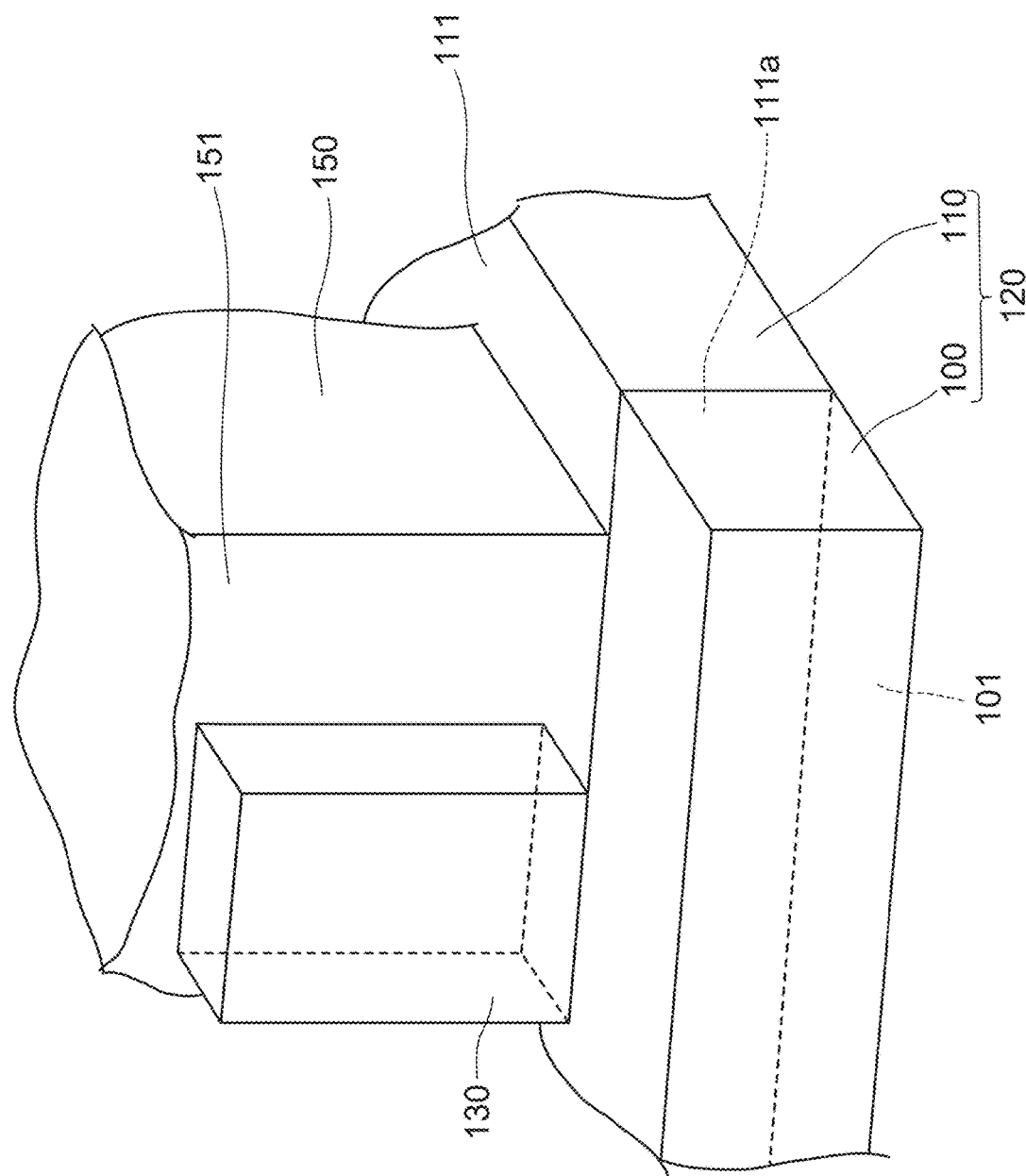
FIG. 3 is a perspective view, with enlargement, of the principal part of the thermally assisted magnetic head.
Figure 4:
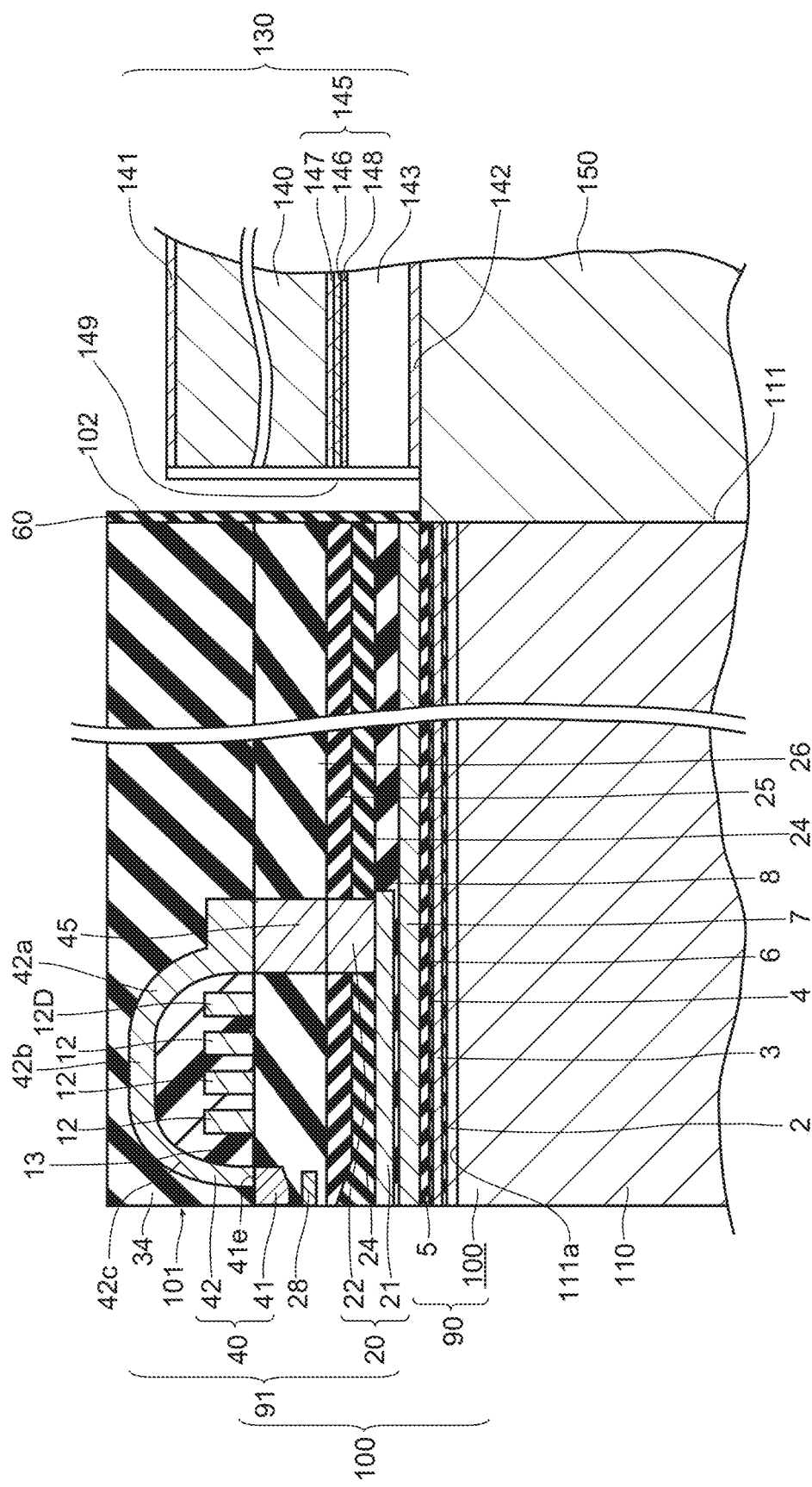
FIG. 4 is a sectional view of the principal part taken along the line 4-4 in FIG. 1.
Figure 5:
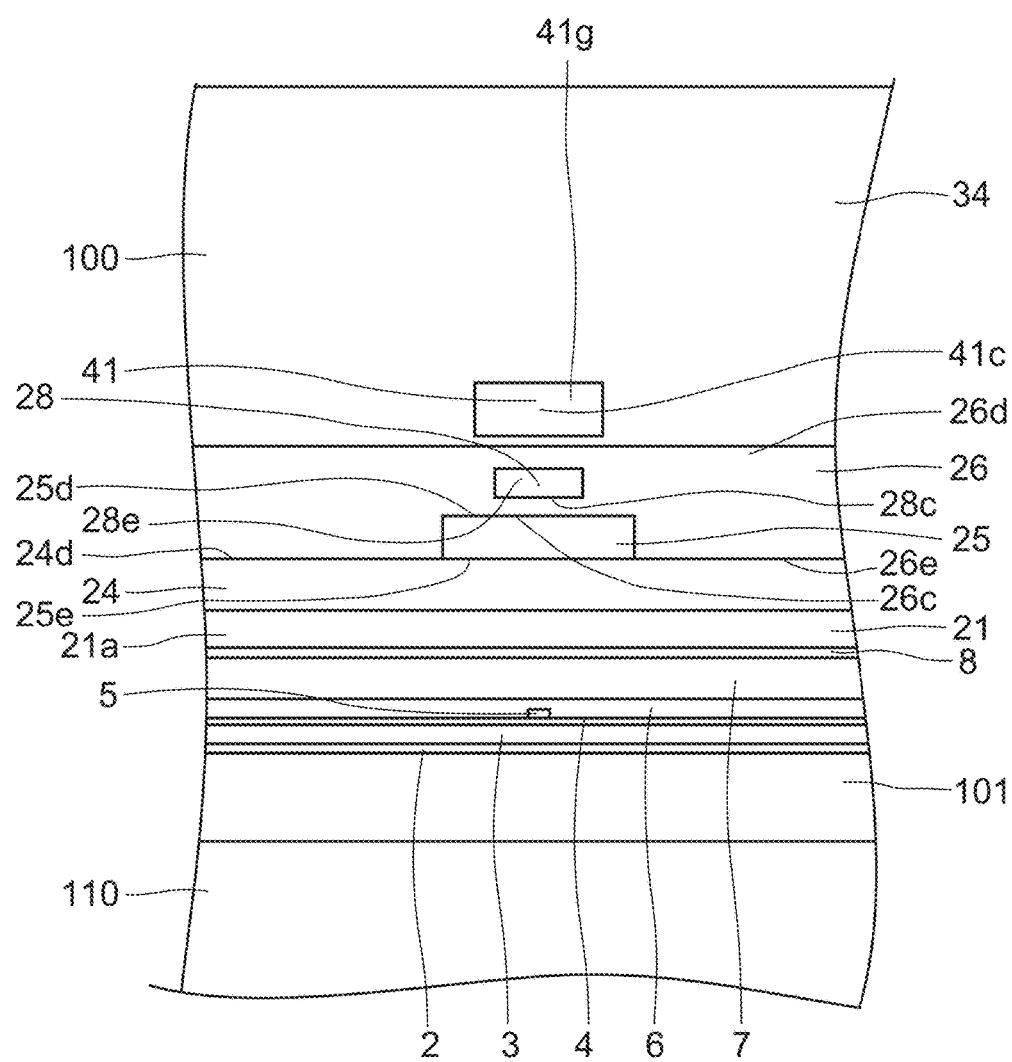
FIG. 5 is a front view, partially omitted, illustrating an air bearing surface of a magnetic head part.

To begin with, structure of the thermally assisted magnetic head according to the embodiment of the present invention will be explained with reference to FIG. 1 to FIG. 5. Here, FIG. 1 is a perspective view of the thermally assisted magnetic head 180 according to the embodiment of the present invention, FIG. 2 is a side view of the thermally assisted magnetic head 180 according to the embodiment of the present invention, FIG. 3 is a perspective view, with enlargement, of the principal part of the thermally assisted magnetic head 180. FIG. 4 is a sectional view of principal part taken along the line 4-4 in FIG. 1, FIG. 5 is a front view, partially omitted, illustrating a medium opposing surface (Air Bearing Surface, which will hereinafter be referred also to as "ABS") 101 of the magnetic head part 100.

The thermally assisted magnetic head 180 has a slider 120 and a light source-unit 160 joined to the slider 120. The thermally assisted magnetic head 180 has a complex-slider-structure which the light source-unit 160 is joined to the slider 120.

The slider 120 has a slider-substrate 110 and the magnetic head part 100 formed on the slider-substrate 110.

The slider-substrate 110 is made of ceramic material such as aluminum oxide-titanium carbide ($Al_2O_3.TiC$) or the like, and it is formed in a rectangular parallelepiped shape. The slider-substrate 110 has the ABS 101 as the medium opposing surface, opposing to the magnetic recording medium, a light source placing surface 111, arranged in the rear side of the ABS 101. A part, of the light source placing surface 111, of the magnetic head part 100 side is a light source-opposing surface 102. The light source-opposing surface 102 opposes to the later-described laser diode 130 of the light source-unit 160.

In the thermally assisted magnetic head 180, the light source-unit 160 is used. In the light source-unit 160, a later-described pair of barrier-members 153 are formed on the sub-mount 150 so as to sandwich a heater 152. Thereby, responsiveness of the temperature-conditioning, of environment by the heater 152, is improved.

(Magnetic Head Part)

Subsequently, the magnetic head part 100 will be explained with mainly reference to FIG. 4 to FIG. 5. The magnetic head part 100 has a reproducing head 90 and a recording head 91. The magnetic head part 100 has a structure which the reproducing head 90 and the recording head 91 are stacked.

The reproducing head 90 has an MR device 5, arranged near the ABS 101, for detecting a magnetic signal. The reproducing head 90 comprises a lower shield layer 3, a lower shield gap film 4, an upper shield gap film 6 and an upper shield layer 7.

Then, an insulating layer 2 is further formed on a thin-film laminated surface 111a of the slider-substrate 110, and the lower shield layer 3 made of a magnetic material is formed on the insulating layer 2. Further, the lower shield gap film 4, as an insulating film, is formed on the lower shield layer 3, and the upper shield gap film 6 shielding the MR device 5 is formed on the lower shield gap film 4. The upper shield layer 7 made of a magnetic material is formed on the upper shield gap film 6, and an insulating layer 8 is formed on the upper shield layer 7.

The MR device 5 is constituted by a magnetosensitive film exhibiting a magnetoresistive effect, such as AMR (anisotropic magnetoresistive), GMR (giant magnetoresistive), and TMR (tunneling magnetoresistive) devices.

The recording head 91 has a thin-film coil 12, a return magnetic layer 20, a core layer 25, a lower dielectric-layer 24, an upper dielectric-layer 26, a near-field light generating layer 28, an overcoat layer 34, a main magnetic pole layer 40, and a linking magnetic pole layer 45, and has a structure in which they are stacked on the thin-film laminated surface 111a.

The thin-film coil 12 has four turn parts. The thin-film coil 12 is wound like a flat spiral about a later-described yoke magnetic pole layer 42 of the main magnetic pole layer 40.

The four turn parts are arranged at respective positions having different distances from the ABS 101. Among them, the turn part 12D is a part arranged at a position most distant from the ABS 101 among the four turn parts of the thin-film coil 12. The four turn parts are insulated from each other by a photoresist 13.

When a current modulated according to data to be recorded on the magnetic recording medium flows through the thin-film coil 12, the current causes the thin-film coil 12 to generate a recording magnetic field.

The return magnetic pole layer 20 has a connecting magnetic pole layer 21, and a rear magnetic pole layer 22. The connecting magnetic pole layer 21 has a magnetic pole end face 21a arranged within the ABS 101 and has a portion that is more distant from the ABS 101 than is the magnetic pole end face 21a being embedded in the insulating layer 8. The connecting magnetic pole layer 21 has a size reaching a position more distant from the ABS 101 than is the turn part 12D. To the connecting magnetic pole layer 21, the rear magnetic pole layer 22 is joined at a position more distant from the ABS 101 than is the turn part 12D.

The rear magnetic pole layer 22 is arranged at a position more distant from the ABS 101 than is the turn part 12D, and it is joined to the connecting magnetic pole layer 21 and the later-described linking magnetic pole layer 45.

The return magnetic pole layer 20 is provided to return a magnetic flux to the main magnetic pole layer 40. When a magnetic flux generated by the recording magnetic field is emitted from a later-described magnetic pole end face 41g of the main magnetic pole layer 40 to the magnetic recording medium, the magnetic flux flows back to the return magnetic pole layer 20 via the magnetic recording medium (a not-depicted soft magnetic layer in detail). This magnetic flux passes through the linking magnetic pole layer 45 and reaches the main magnetic pole layer 40.

The core layer 25 is a wave guide which guides laser light, generated by the later-described laser diode 130 of the light source-unit 160, from the light source-opposing surface 102 to the ABS 101. The core layer 25, as illustrated in FIG. 4, is formed along with a depth direction, passing through between the linking magnetic pole layer 45, from the ABS 101 to the light source-opposing surface 102.

The core layer 25 is formed with dielectric such as tantalum oxide (TaO$_x$) or the like. For example, the core layer 25 is able to be formed with Ta$_2$O$_5$ (for example, the refractive index is about 2.16).

The core layer 25 is formed so as to be accommodated in a later-described concave part 26c of the upper dielectric-layer 26, on an upper surface 24d of the lower dielectric-layer 24. Further, an upper surface 25d and both side surfaces, of the core layer 25, are in contact with the upper dielectric-layer 26, and a lower surface 25e, of the core layer 25, is in contact with the lower dielectric-layer 24.

Then, the upper dielectric-layer 26 and the lower dielectric-layer 24 are arranged in the surrounding of the core layer 25, the cladding layer is constituted by the upper dielectric-layer 26 and the lower dielectric-layer 24.

The upper dielectric-layer 26 is formed in a substantially flat plate shape having a width larger than the width of the magnetic pole end part layer 41. The upper dielectric-layer 26 is formed with dielectric, having the lower refractive index than the core layer 25, for example, such as aluminum oxide (AlO$_x$) or the like. For example, the upper dielectric-layer 26 is able to be formed with alumina (Al$_2$O$_3$, for example, the refractive index is about 1.63). Then, the concave part 26c is formed on the lower surface 26e of the upper dielectric-layer 26, the core layer 25 is accommodated in the concave part 26c.

The lower dielectric-layer 24 is formed so as to be in contact with the lower surface 25e of the core layer 25 and the lower surface 26e of the upper dielectric-layer 26. The lower dielectric-layer 24 is able to be formed with dielectric such as aluminum oxide (AlO$_x$) or the like, similar with the upper dielectric-layer 26.

For example, the lower dielectric-layer 24 is able to be formed with alumina (Al$_2$O$_3$).

The near-field light generating layer 28 has a structure formed in a rectangular shape as a whole, seen from the ABS 101.

The near-field light generating layer 28 is made of metal and formed of, for example, one of Au, Ag, Al, Cu, Pd, Pt, Rh, Ir or an alloy made of a plurality of those elements.

The near-field light generating layer 28 has a bottom part 28c. The bottom part 28c is arranged at the deepest positions of the near-field light generating layer 28. The bottom part 28c extends from the ABS 101 in the depth direction. The end surface of the bottom part 28c on the ABS 101 side is arranged within the ABS 101. This end surface is a generating end part 28e. The generating end part 28e generates near-field light for heating the magnetic recording medium.

The main magnetic pole layer 40 has the magnetic pole end part layer 41 and the yoke magnetic pole layer 42. The magnetic pole end part layer 41 and the yoke magnetic pole layer 42 have a symmetrical structure formed to be bilaterally symmetrical about a front end part 41c.

The front surface including the front end part 41c constitutes the magnetic pole end surface 41g. The magnetic pole end surface 41g is arranged within the ABS 101. The yoke magnetic pole layer 42 is joined to an upper surface 41e of the magnetic pole end part layer 41.

The yoke magnetic pole layer 42 has a rear magnetic pole layer 42a, a middle magnetic pole layer 42b, and a front magnetic pole layer 42c. The yoke magnetic pole layer 42 has a curved structure extending from the ABS 101 in the depth direction and leading to the linking magnetic pole layer 45 straddling the thin-film coil 12.

The rear magnetic pole layer 42a is arranged at a position more distant from the ABS 101 than are the four turn parts of the thin-film coil 12. The rear magnetic pole layer 42a has a lateral width larger than that of the middle magnetic pole layer 42b (the largest lateral width in the yoke magnetic pole layer 42) and is joined to the linking magnetic pole layer 45. The middle magnetic pole layer 42b is arranged above the thin-film coil 12. The middle magnetic pole layer 42b is connected to the rear magnetic pole layer 42a and the front magnetic pole layer 42c. The middle magnetic pole layer 42b has a lateral width gradually getting smaller as it approaches to the ABS 101. The front magnetic pole layer 42c is formed in a downward curved structure getting closer to the magnetic pole end part layer 41 as it approaches to the ABS 101. The front magnetic pole layer 42c is joined to the surface 41e of the magnetic pole end part layer 41.

The linking magnetic pole layer 45 is arranged in a manner to hold the core layer 25 from both right and left sides at a position more distant from the ABS 101 than is the thin-film coil 12. Further, the linking magnetic pole layer 45 is joined to the rear magnetic pole layer 22. The linking magnetic pole layer 45 magnetically links the return magnetic pole layer 20 to the main magnetic pole layer 40, and has a role of returning, to the main magnetic pole layer 40, the magnetic flux flown back to the return magnetic pole layer 20.

(Light Source-Unit)

Figure 6:
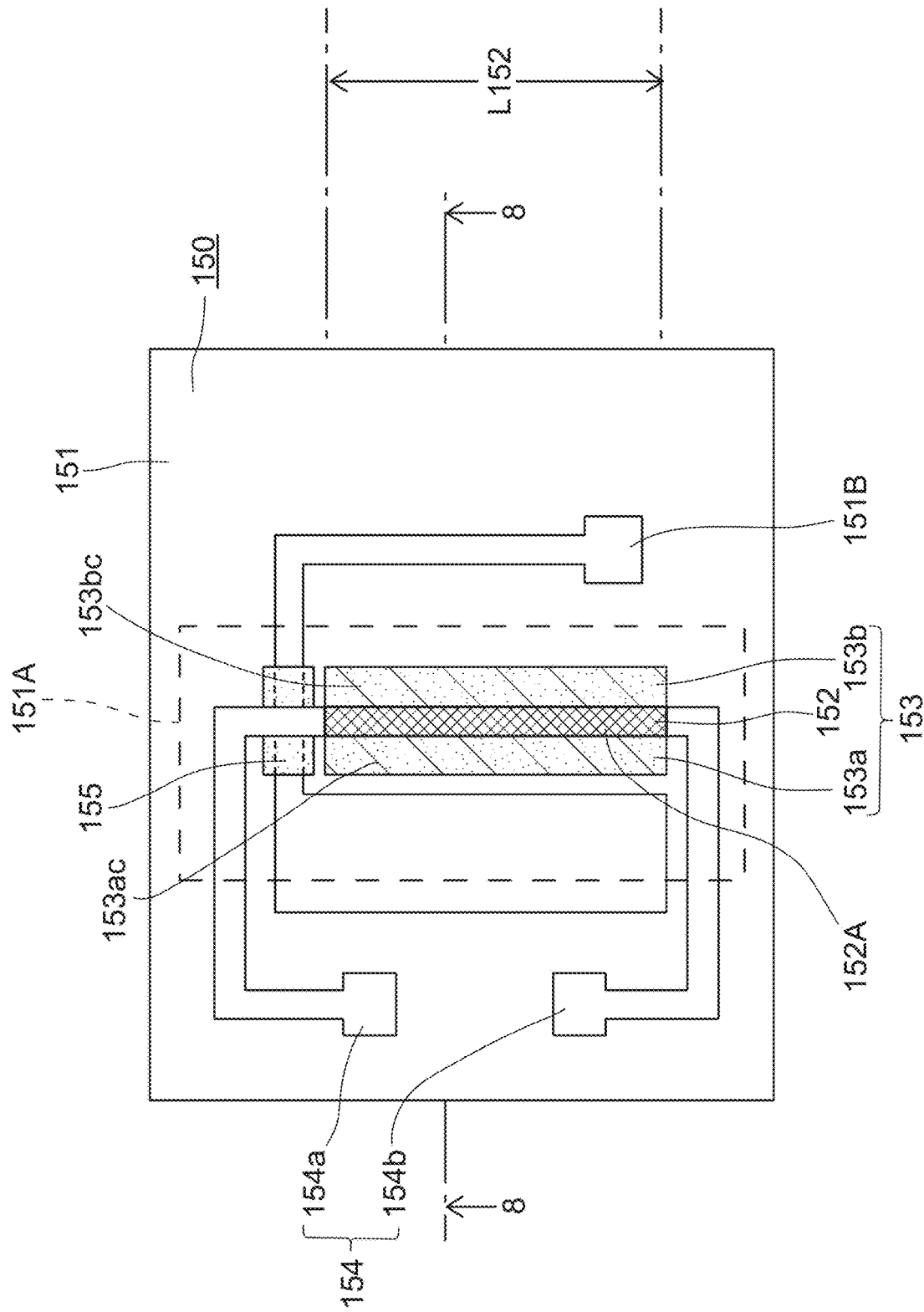
FIG. 6 is a plan view showing a sub-mount constituting the light source-unit which is used for the thermally assisted magnetic head.
Figure 7:
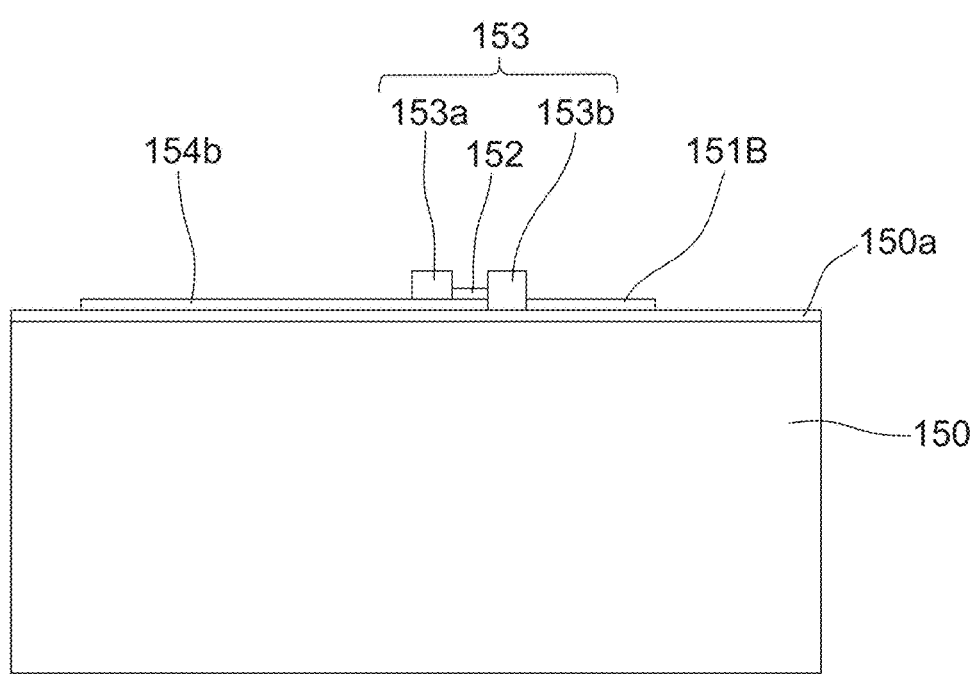
FIG. 7 is a side view showing the sub-mount.
Figure 8:
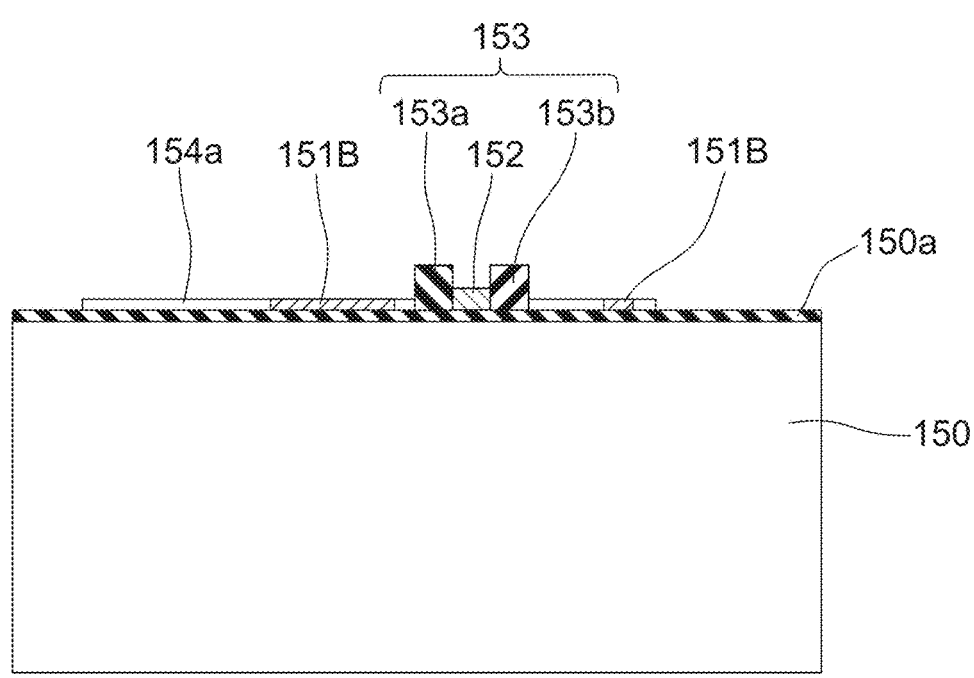
FIG. 8 is a sectional view taken along the line 8-8 in FIG. 6.
Figure 9:
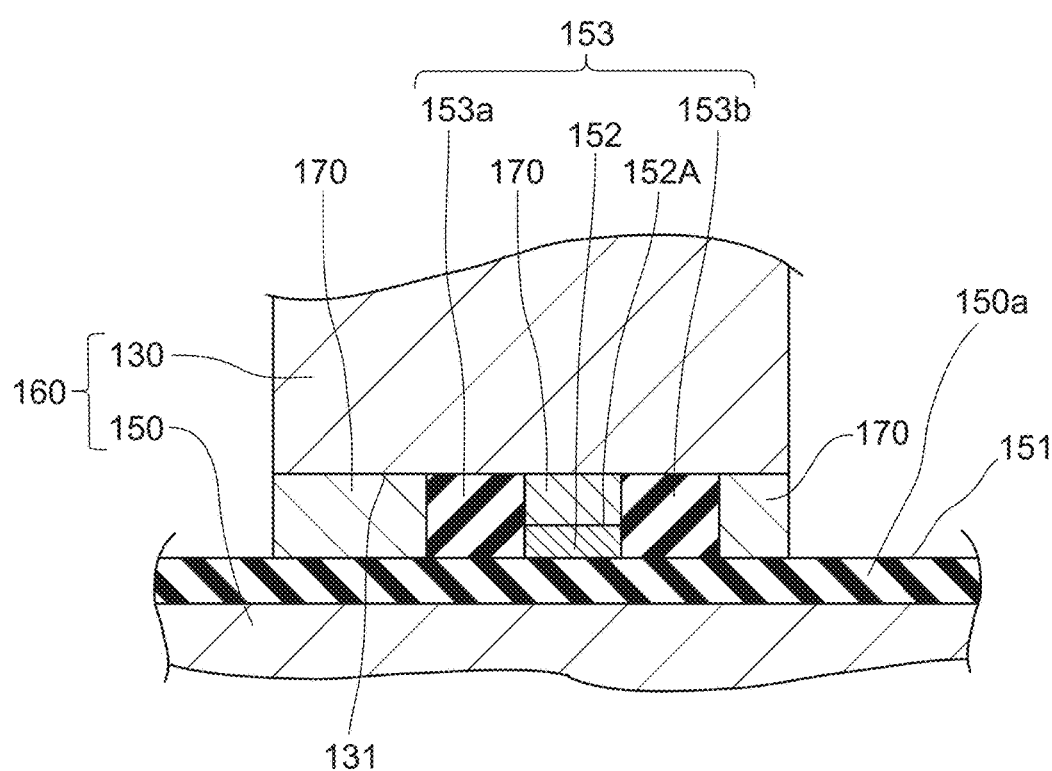
FIG. 9 is a sectional view, with enlargement, showing a principal part of the light source-unit, corresponding to FIG. 8.
Figure 10:
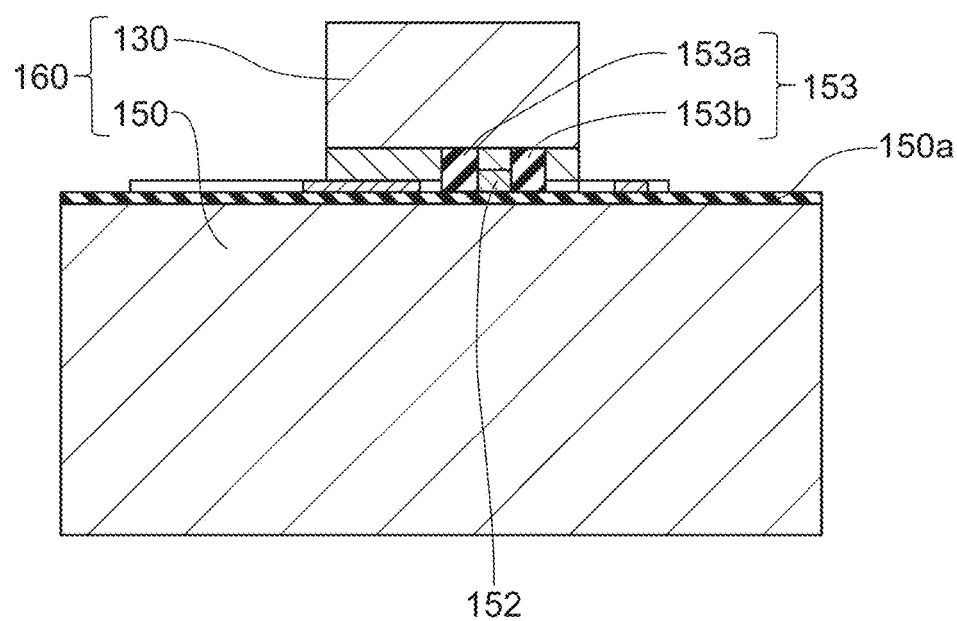
FIG. 10 is a sectional view showing the light source-unit, corresponding to FIG. 8.
Figure 11:
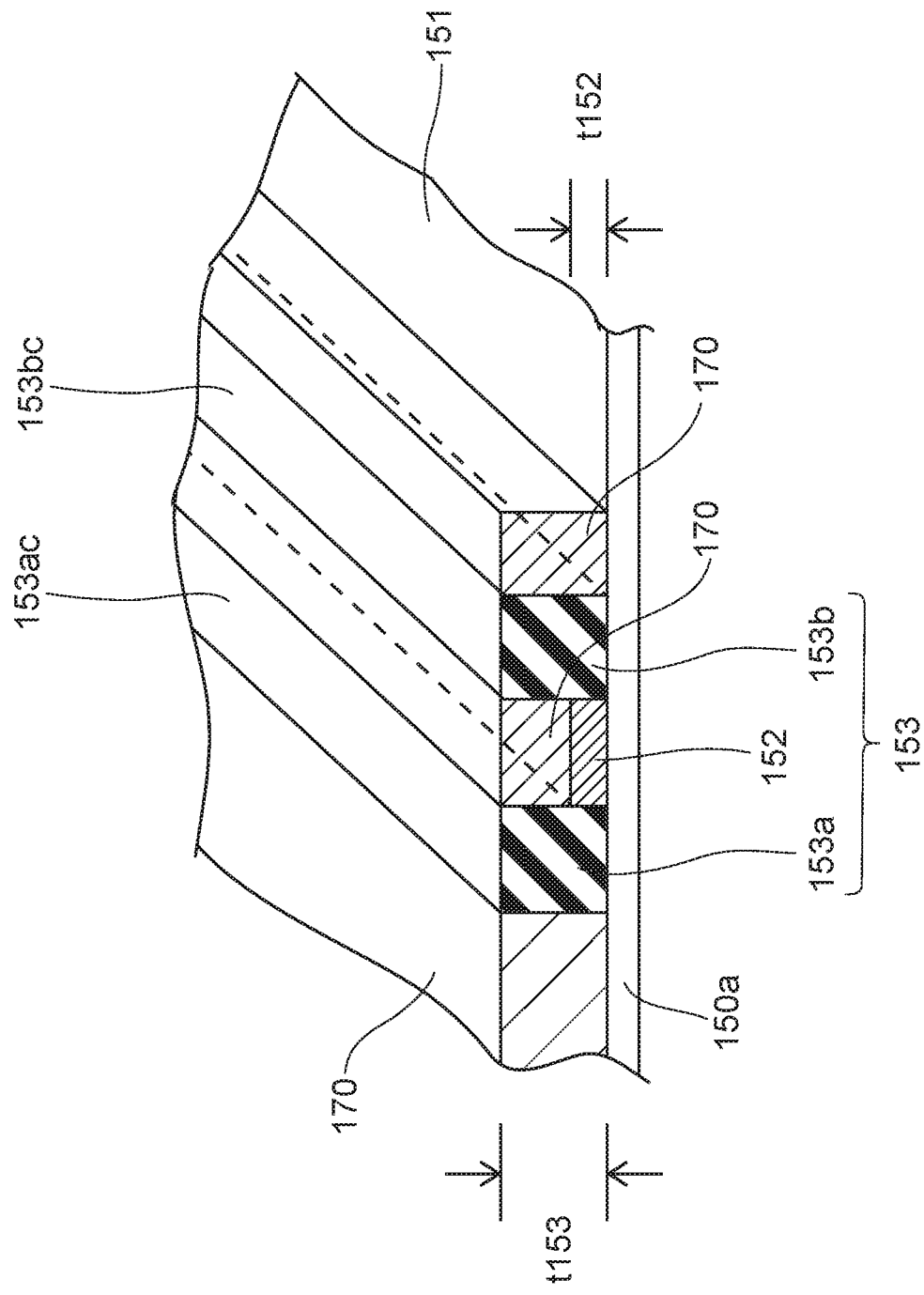
FIG. 11 is a perspective view, with enlargement, showing the sub-mount.
Figure 12:
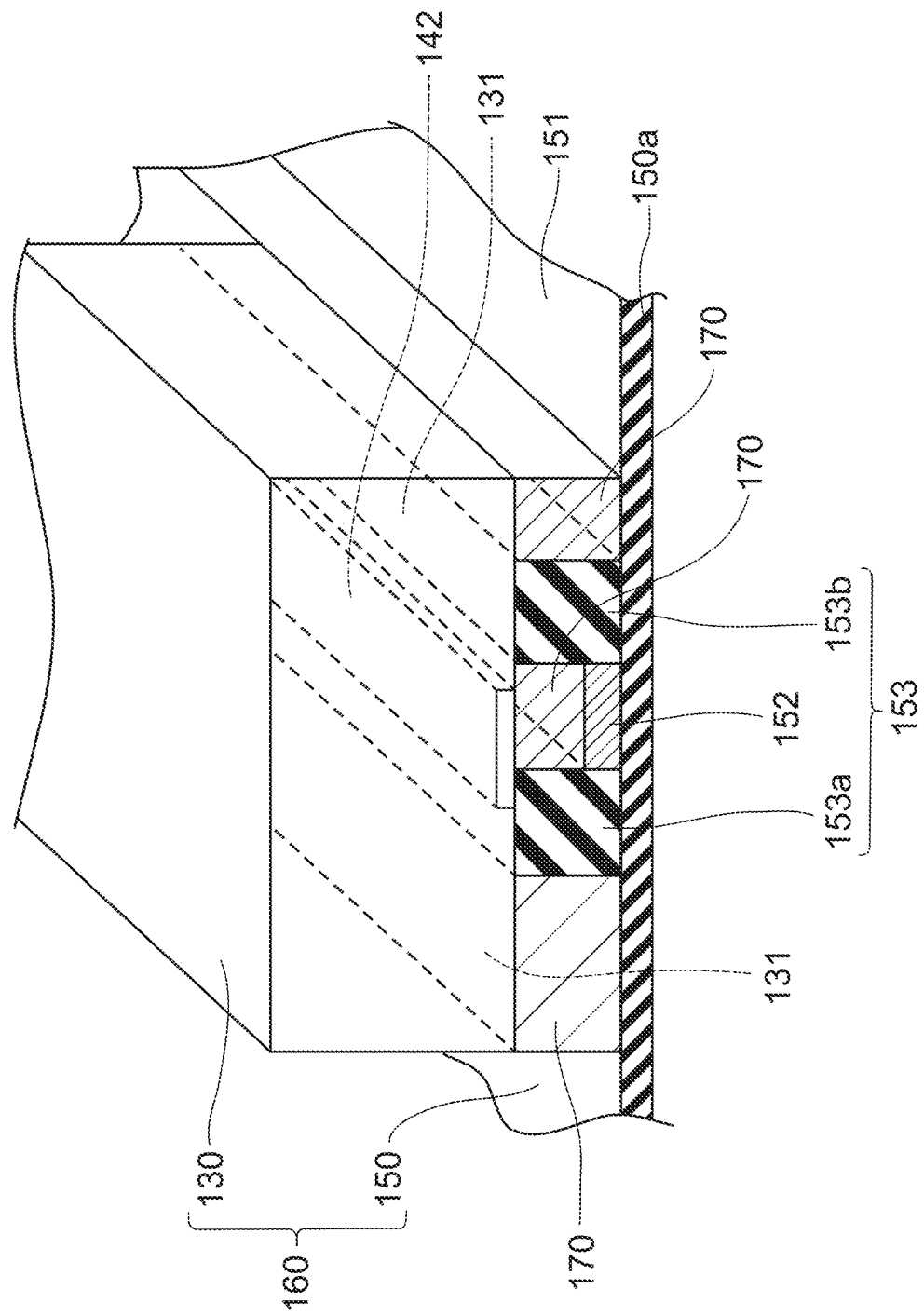
FIG. 12 is a perspective view, with enlargement, showing the light source-unit, corresponding to FIG. 11.

Subsequently, the light source-unit 160 will be explained with reference to FIG. 6 to FIG. 12, in addition to FIG. 1 to FIG. 5. FIG. 6 is a plan view showing the sub-mount 150 constituting the light source-unit 160 which is used for the thermally assisted magnetic head 180, FIG. 7 is a side view showing the sub-mount 150, FIG. 8 is a sectional view taken along the line 8-8 in FIG. 6. FIG. 9 is a sectional view, with enlargement, showing a principal part of the light source-unit 160. FIG. 10 is a sectional view showing the light source-unit 160, corresponding to FIG. 8. FIG. 11 is a perspective view, with enlargement, showing the sub-mount 150. FIG. 12 is a sectional view, with enlargement, showing the light source-unit 160, corresponding to FIG. 11.

The light source-unit 160 has the laser diode 130, the sub-mount 150 and the heater 152. The laser diode 130 is joined to the sub-mount 150 to constitute the light source-unit 160.

As illustrated in FIG. 4, the laser diode 130 has an n-substrate 140, a stripe n-electrode 141 having band like shape, a light emitting layer 145, and a stripe p-electrode 142 having band like shape, and it has a rectangle parallelepiped shape. In addition, the stripe n-electrode 141 is joined to a surface on the outside of the n-substrate 140. Further, the light emitting layer 145 is formed on a side of the n-substrate 140 opposite to the stripe n-electrode 141, and the stripe p-electrode 142 is joined on the light emitting layer 145, via a ground layer 143.

The light emitting layer 145 has an active layer 146, an n-cladding layer 147, and a p-cladding layer 148, and has a structure in which the active layer 146 is sandwiched between the n-cladding layer 147 and the p-cladding layer 148.

Then, the laser diode 130 is joined to the sub-mount 150 so that the active layer 146 opposes to the core layer 25, and an emitting part 149 is arranged in a part, of the light emitting layer 145, opposing to the core layer 25. The emitting part 149 is a part, of the laser diode 130, which emits the laser light. The laser diode 130 has an opposing-surface 131. The opposing-surface 131 is a part, of the surface of the laser diode 130, which opposes to the sub-mount 150. The opposing-surface 131 opposes to a later-described joint-surface 151 of the sub-mount 150.

The sub-mount 150 is made of a silicon (Si), and it is formed in a rectangular parallelepiped shape. The sub-mount 150 has a size larger than the laser diode 130. Further, the sub-mount 150 is able to be formed with semiconductor material such as GaAs, SiC or the like, or a ceramic material such as aluminum oxide-titanium carbide ($Al_2O_3.TiC$) or the like.

Then, as illustrated in FIG. 6 to FIG. 9 in detail, the sub-mount 150 has a surface insulating layer 150a made silicon dioxide ($SiO_2$). The surface of the surface insulating layer 150a constitutes a joint-surface 151 which the laser diode 130 is joined. The joint-surface 151 is formed in a flat rectangular shape. The joint-surface 151 has a size larger than the opposing-surface 131 of the laser diode 130.

Further, as illustrated in FIG. 6 in detail, the part, of the joint-surface 151, which opposes to the opposing-surface 131 is a light-source area 151A. The light-source area 151A is a rectangular part, illustrated with a broken line, in FIG. 6. The heater 152 is joined in the light-source area 151A. Furthermore, in the light-source area 151A, a pair of barrier-members 153 (153a, 153b) is formed on the joint-surface 151 so as to sandwich the heater 152.

The heater 152 is formed in a straight band-like shape. The heater 152 is made of, for example, tungsten, platinum or the like, and it has high resistivity. Connecting pads 154a, 154b, of the circuit pattern 154, are connected with both end parts, along with the length direction, of the heater 152. Therefore, electric power is supplied to the heater 152 from the circuit pattern 154. The circuit pattern 151B is connected with the laser diode 130. The circuit pattern 151B is insulated with circuit pattern 154 by an insulating part 155.

The barrier-members 153 (153a, 153b) are formed in a straight band-like shape similar with the heater 152 using lower thermal conductivity material.

Lower thermal conductivity material is a material which thermal conductivity is lower than joining metal. Joining metal is metal which is used for joining the laser diode 130 and the sub-mount 150, for example, solder (alloy metal including tin) or tin correspond to joining metal. In this case, for example, silicon dioxide ($SiO_2$) is able to be used for lower thermal conductivity material. Therefore, the barrier-members 153 (153a, 153b) are able to be formed using silicon dioxide ($SiO_2$), similar with the joint-surface 151.

Further, the barrier-members 153 (153a, 153b) are arranged both sides of the heater 152. The barrier-members 153a, 153b are formed on the joint-surface 151 so as to sandwich the heater 152 from the both sides. The barrier-members 153a, 153b are directly in contact with both the side surfaces of the heater 152 along with the length direction.

As illustrated in FIG. 11, the barrier-members 153a, 153b have thickness t153 larger than the thickness t152 of the heater 152. The barrier-members 153a, 153b protrude from the joint-surface 151 by the size of the thickness t153. Further, the barrier-members 153a, 153b have the same size with the length of the heater 152 along with the length direction (heater length L152, see FIG. 6). Note that the barrier-members 153a, 153b are able to have size larger than the L152, not illustrated though.

Then, the barrier-members 153 and the heater 152 are arranged on the joint-surface 151 along with the length direction of the stripe p-electrode 142. In the joint-surface 151, the length direction of the barrier-members 153 and the heater 152 match with the length direction of the stripe p-electrode 142.

Further, the barrier-members 153a, 153b have flat upper-surfaces 153ac, 153bc. The flat upper-surfaces 153ac, 153bc are surfaces, of the barrier-members 153a, 153b, of the laser diode 130 side, they are formed in a flat rectangular shape along with the joint-surface 151. Parts, with dot-hatching in FIG. 6, are the flat upper-surfaces 153ac, 153bc.

Then, as illustrated in FIG. 6, FIG. 12, in the light source-unit 160, the laser diode 130 is joined to the sub-mount 150 so that the opposing-surface 131 is arranged on the upper side of the barrier-members 153 (153a, 153b), in the light-source area 151A of the joint-surface 151.

As described above, the heater 152 and the barrier-members 153 (153a, 153b) are arranged in the light-source area 151A. In the light-source area 151A, the laser diode 130 is joined to the sub-mount 150. Therefore, as illustrated in FIG. 9, FIG. 12, a joining metal layer 170 is formed between the opposing-surface 131 and the joint-surface 151, of the light-source area 151A.

The joining metal layer 170 is a layer made of joining metal which is used for joining the laser diode 130 and the sub-mount 150. Further, the joining metal layer 170 is formed so as to be directly in contact with the surface 152A of the heater 152, in the part between the barrier-member 153a and the barrier-member 153b. The joining metal layer 170 is also arranged outside the barrier-members 153a, 153b.

As described above, for example, solder (alloy metal including tin), tin (Sn) and gold (Au) are able to be used as joining metal. When tin (Sn) and gold (Au) are used as joining metal, alloy layer, made of alloy (AuSn alloy)

including tin and gold, and metal layer, including gold, are included in the joining metal layer 170.

The sub-mount 150 of the light source-unit 160, having the above-described constitution, is joined to the slider 120 to constitute the thermally assisted magnetic head 180.

(Operation and Effect of the Light Source-Unit)

As described above, the light source-unit 160 is manufactured by joining the sub-mount 150 and the laser diode 130. As described above, the sub-mount 150 has a pair of barrier-members 153 (153a, 153b), the barrier-members 153 (153a, 153b) are formed on the joint-surface 151 so as to sandwich the heater 152.

Therefore, heat which is generated from the heater 152 (also referred to as "heater heat") is transmitted to the barrier-members 153 (153a, 153b). However, because the barrier-members 153 (153a, 153b) are formed with lower thermal conductivity material, heat conduction, which heater heat is transmitted outside the barrier-members 153a, 153b, is hard to occur. Accordingly, heater heat is easily kept in an area between the barrier-member 153a and barrier-member 153b (also referred to as "barrier-area"). Then because temperature keeping function for barrier-area is exhibit by the barrier-members 153a, 153b, temperature change of the barrier-area is enlarged.

Figure 13:
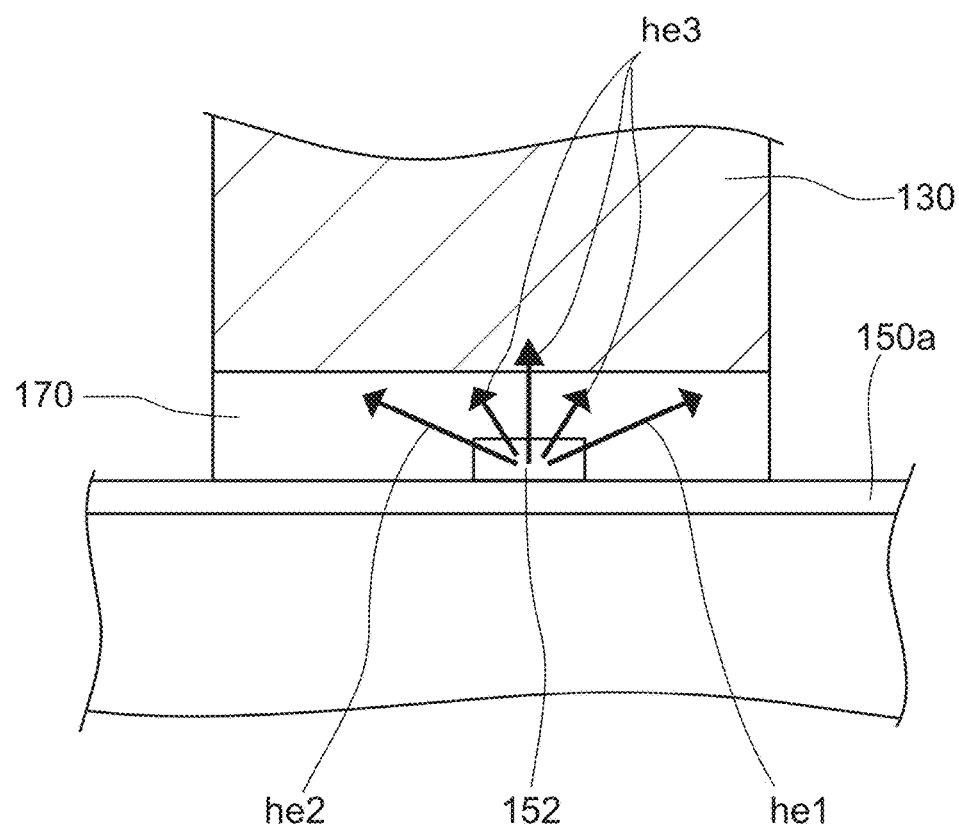
FIG. 13 is a view schematically showing heat radiating condition of the case which the light source-unit does not have a barrier-member.

As illustrated in FIG. 13, if the barrier-members 153a, 153b are not formed in both sides of the heater 152, because thermal conductivity of the joining metal layer 170 is high, heater heat he1, he2, he3 radiate toward outside. Then, heater heat, which contributes the temperature change, is reduced, thereby efficiency of the temperature change by heater heat is lowered.

On the other hand, in the light source-unit 160 according to the embodiment, the barrier-members 153a, 153b are formed on the joint-surface 151 so as to sandwich the heater 152. Thereby, because temperature keeping function for barrier-area is exhibit by the barrier-members 153a, 153b, wasted heater heat, by the diffusion, is reduced. Then, because heater heat operates more effectively to the temperature change of the stripe p-electrode 142, temperature of the stripe p-electrode 142 is conditioned more effectively. Therefore, it is possible to improve responsiveness of the temperature-conditioning by the heater 152 so that the temperature-conditioning by the heater 152 is responsive for temperature change of the stripe p-electrode 142.

Further, because the heater 152 is formed in a straight band-like shape, and the barrier-members 153 (153a, 153b) are also formed in a straight band-like shape, diffusion of heater heat along with the joint-surface 151 is effectively prevented. Furthermore, because the barrier-members 153 (153a, 153b) have thickness t153 larger than the thickness t152 of the heater 152, diffusion of heater heat is more surely prevented. Because the barrier-members 153a, 153b have the same size with the heater length L152, diffusion of heater heat is more surely prevented.

Moreover, because the heater 152 and the barrier-members 153 (153a, 153b) are arranged along with the length direction of the stripe p-electrode 142, the direction of the stripe p-electrode 142 is overlapped with the direction of the heater 152, influences of temperature change of them are also overlapped. Therefore, temperature change is more effectively performed.

Both the heater 152 and the barrier-members 153 (153a, 153b) are arranged in the light-source area 151A. Therefore, the heater 152 and the barrier-members 153 (153a, 153b) are arranged near the stripe p-electrode 142, thereby temperature-conditioning by the heater 152 is more effectively performed.

Further, because the barrier-members 153 (153a, 153b) have the flat upper-surfaces 153ac, 153bc, when the laser diode 130 is joined to the sub-mount 150, the laser diode 130 is supported by the flat upper-surfaces 153ac, 153bc, thereby the laser diode 130 is joined stably.

Figure 15A:
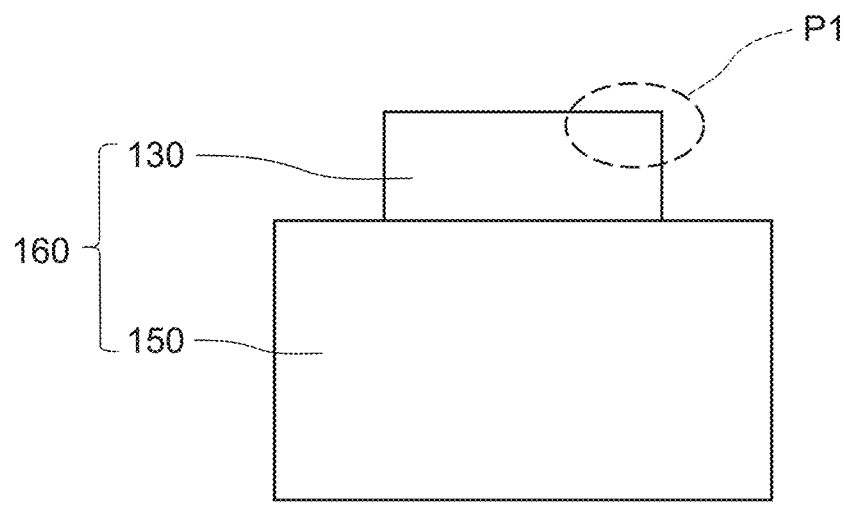
FIG. 15(a) is a side view showing the light source-unit of P-up form.
Figure 15B:
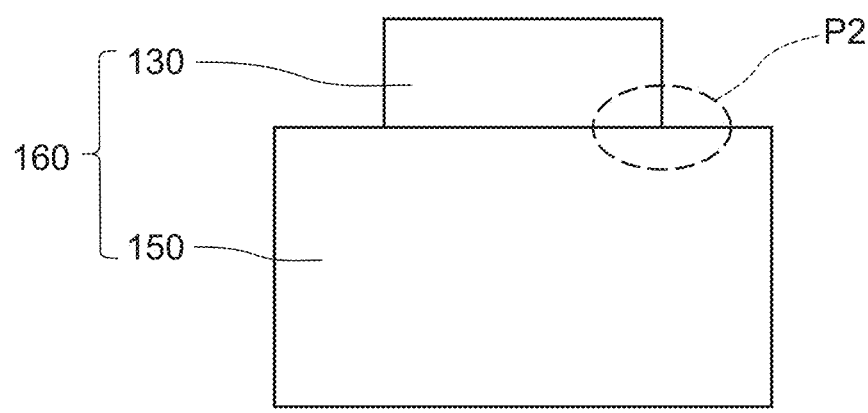
FIG. 15(b) is a side view showing the light source-unit of P-down form.

Further, as the light source-unit 160, there are the P-up form illustrated in FIG. 15(a) and the P-down form illustrated in FIG. 15(b), this embodiment is able to be applicable to both the P-up form and P-down form. In the P-up form, emitting point p1 is located on the position far from the sub-mount 150. In the P-down form, emitting point p2 is located on the position near the sub-mount 150.

In the above-described embodiment, the barrier-members 153 (153a, 153b) have thickness t153 larger than the thickness t152 of the heater 152. The present invention is applicable for the case which the thickness of the barrier-members 153 (153a, 153b) is smaller than the thickness of the heater 152, the case which the thickness of the barrier-members 153 (153a, 153b) is equal to the thickness of the heater 152 (not illustrated).

EXAMPLE

The present inventors simulate concerning investigation for temperature change of both edge part e1 of the stripe p-electrode 142 and center part e2 of the stripe p-electrode 142 (see FIG. 14), about both the case which barrier-members are formed (w/o barrier) and the case which barrier-members are not formed (w/ barrier). The results are shown in FIG. 16(a), FIG. 16(b).

Figure 16B:
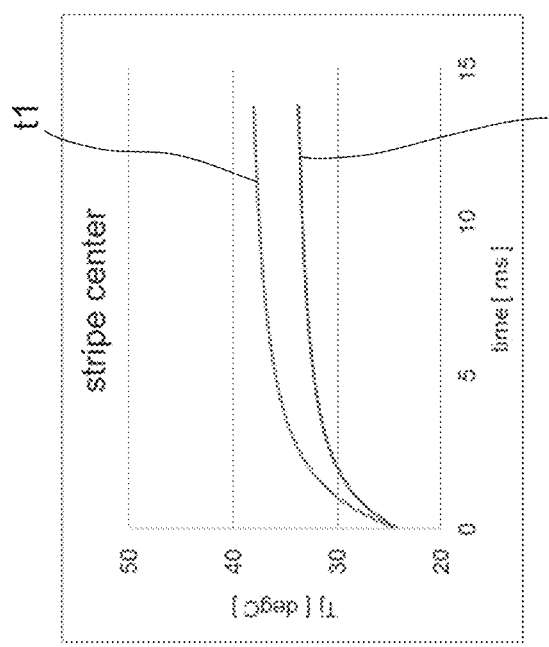
FIG. 16(b) is a view showing the temperature change in the center part of the stripe electrode.
Figure 16A:
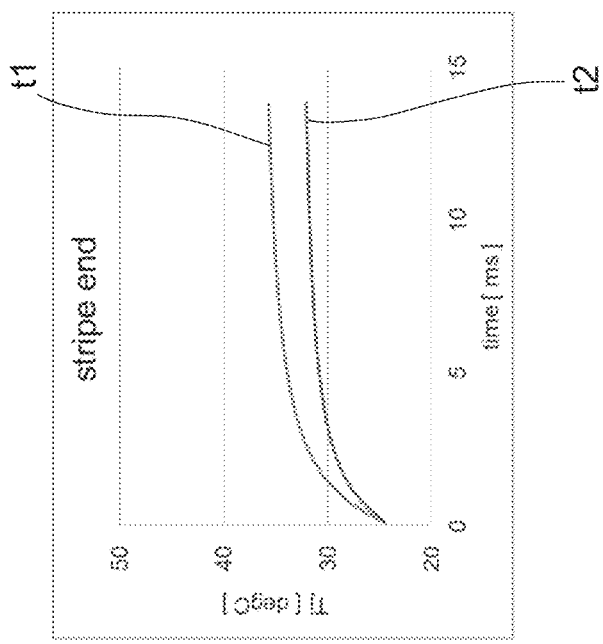
FIG. 16(a) is a view showing the temperature change in the edge part of the stripe electrode.
Figure 17:
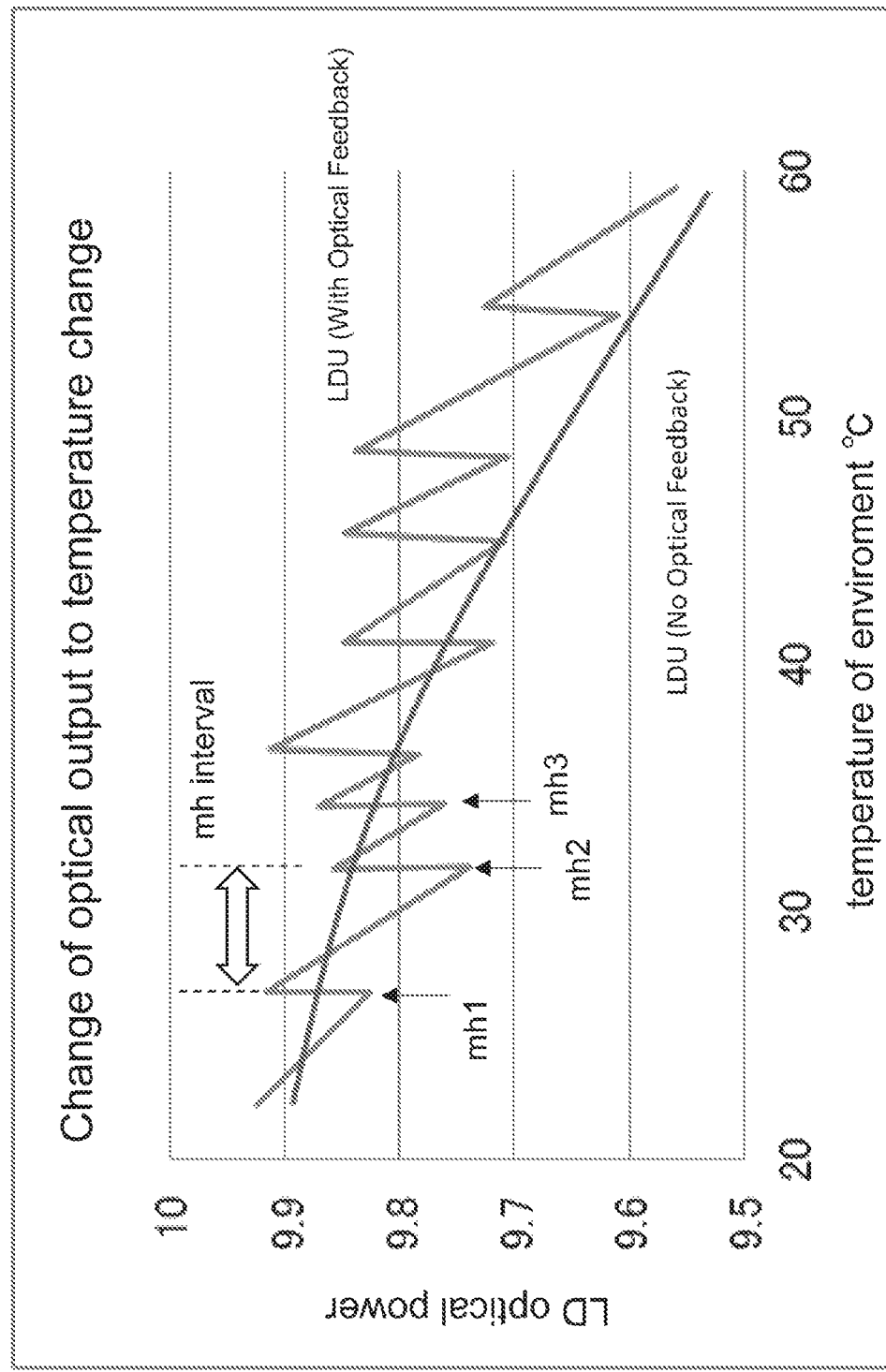
FIG. 17 is a graph showing the change of optical output to the temperature change of environment, in the condition which constant current flows in the laser diode.
Figure 18A:
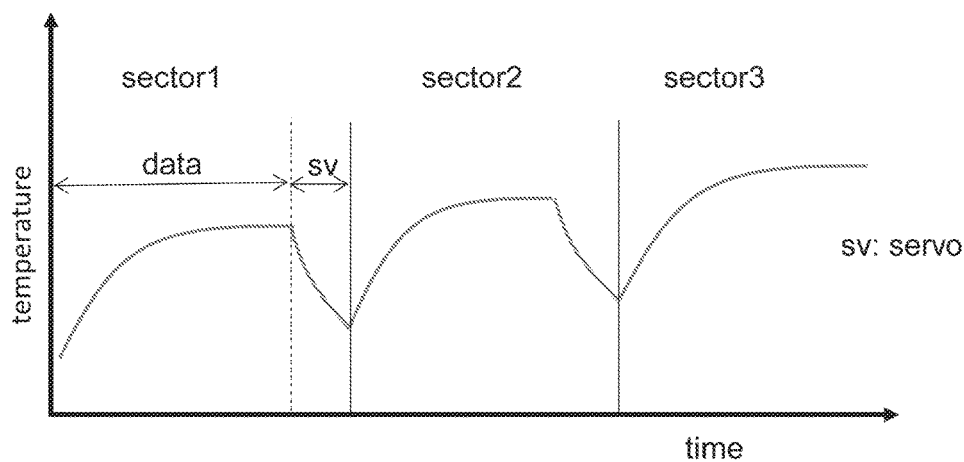
FIG. 18(a) is a graph showing the temperature change in the stripe electrode.
Figure 18B:
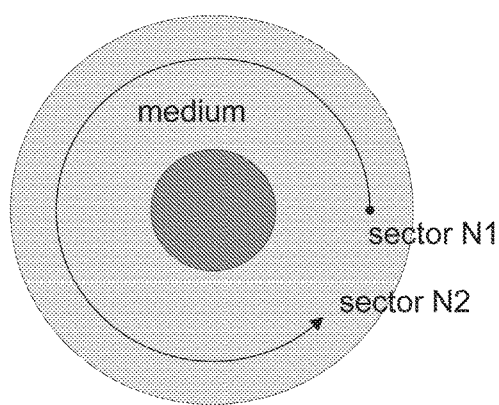
FIG. 18(b) is a view schematically showing the sectors of hard disk.

FIG. 16(a) is a view showing the temperature change in the edge part e1 of the stripe p-electrode 142, FIG. 16(b) is a view showing the temperature change in the center part e2 of the stripe p-electrode 142. In each drawing, t1 shows the case which barrier-members are formed, t2 shows the case which barrier-members are not formed.

As illustrated in FIG. 16(a), FIG. 16(b), it is confirmed that temperature of the stripe p-electrode 142 rises in a short time in the case which barrier-members are formed, than the case which barrier-members are not formed. Therefore, the barrier-members 153a, 153b are formed to improve the efficiency of the temperature-conditioning.

(Embodiments of Head Gimbal Assembly and Hard Disk Drive)

Next, embodiments of the head gimbal assembly and hard disk drive will now be explained with reference to FIG. 19 to FIG. 20.

Figure 20:
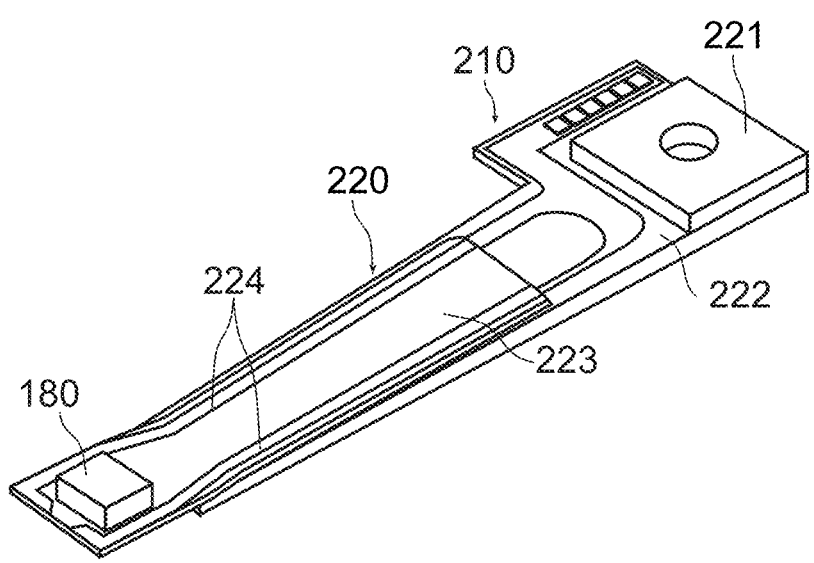
FIG. 20 is a perspective view illustrating a rear side of the HGA.

FIG. 20 is a perspective view showing a hard disk drive 201 equipped with the above-mentioned thermally assisted magnetic head 180. The hard disk drive 201 includes a hard disk (magnetic recording medium) 202 rotating at a high speed and a head gimbal assembly (HGA) 210. The hard disk drive 201 is an apparatus which actuates the HGA 210, so as to record/reproduce data onto/from recording surfaces of the hard disk 202. The hard disk 202 has a plurality of (4 in the drawing) platters. Each platter has a recording surface opposing its corresponding the thermally assisted magnetic head 180.

The hard disk drive 201 positions the slider 120 on a track by an assembly carriage device 203. Further, the hard disk drive 201 has a plurality of drive arms 209. The drive arms pivot about a pivot bearing shaft 206 by means of a voice coil motor (VCM) 205, and are stacked in a direction along the pivot bearing shaft 206. Further, the HGA 210 is attached to the tip of each drive arm.

Further, the hard disk drive 201 has a control circuit 204 controlling recording/reproducing and the generation of light by the laser diode 130.

Figure 19:
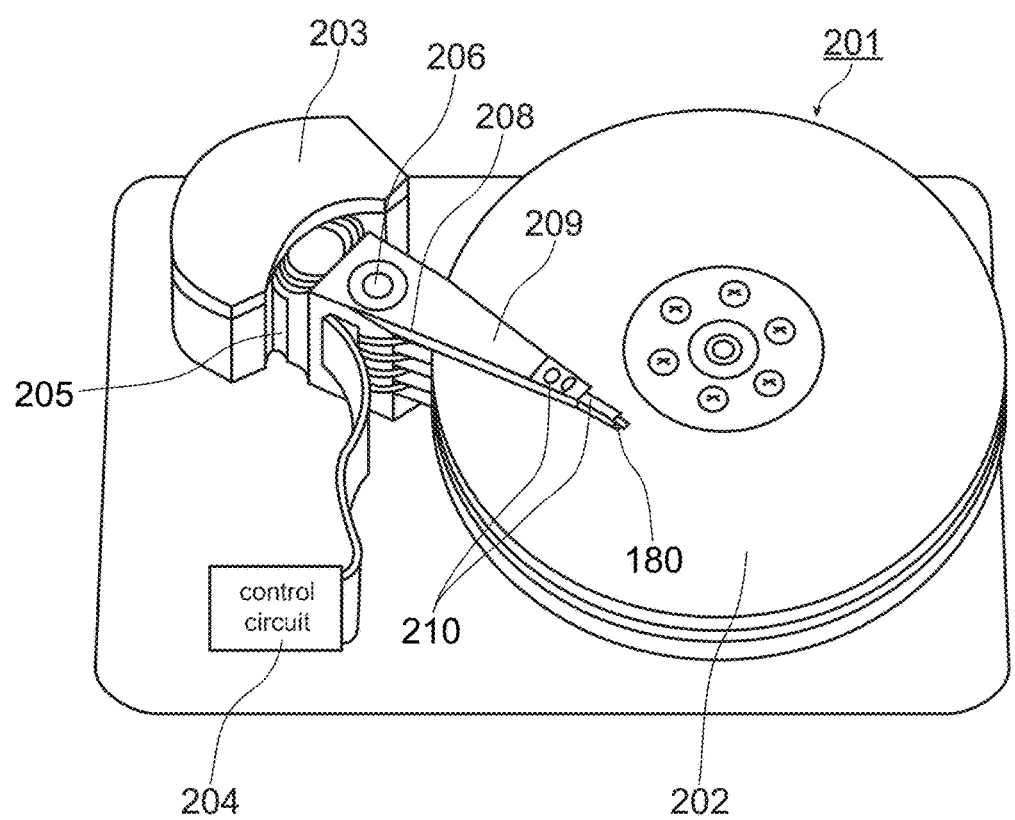
FIG. 19 is a perspective view illustrating a hard disk drive equipped with the thermally assisted magnetic head in FIG. 1.

FIG. 19 is a perspective view illustrating a rear surface side of the HGA 210. In the HGA 210, the thermally assisted magnetic head 180 is fixed to a tip portion of a suspension 220. Further, in the HGA 210, one end portion of a wiring member 224 is electrically connected to a terminal electrode of the slider 120.

The suspension 220 has a load beam 222, a base plate 221 provided at a base portion of the load beam 222, a flexure 223 fixed to and supported on the load beam 222 from the tip end side to the front side of the base plate 221 and having elasticity, and the wiring member 224. The wiring member 224 has a lead conductor and connection pads electrically connected to both ends of the lead conductor.

In the hard disk drive 201, when the HGA 210 is rotated, the slider 120 moves in a radial direction of the hard disk 202, i.e., a direction traversing track lines.

The aforementioned HGA 210 and hard disk drive 201 have the thermally assisted magnetic head 180, thereby temperature-conditioning by the heater 152 being responsive, is able to be performed, thereby mode hopping is restrained.

Though the above-mentioned embodiments explain a type in which a thin-film coil is wound like a flat spiral about the main magnetic pole layer by way of example, the present invention is also applicable to a type in which the thin-film coil is wound helically about the main magnetic pole layer.

This invention is not limited to the foregoing embodiments but various changes and modifications of its components may be made without departing from the scope of the present invention. Besides, it is clear that various embodiments and modified examples of the present invention can be carried out on the basis of the foregoing explanation. Therefore, the present invention can be carried out in modes other than the above-mentioned best modes within the scope equivalent to the following claims.

What is claimed is:

1. A light source-unit which is used for a thermally assisted magnetic head comprising:
   a laser diode;
   a sub-mount which the laser diode is joined; and a heater which is joined on a joint surface, of the sub-mount, which the laser diode is joined;
   wherein the sub-mount comprises a pair of barrier-members,
   wherein the barrier-members are formed with lower thermal conductivity material which thermal conductivity is lower than a joining metal which is used for joining the laser diode and the sub-mount,
   wherein the barrier-members are formed on the joint surface so as to sandwich the heater.

2. The light source-unit according to claim 1,
   wherein the heater is formed in a straight band-like shape and the barrier-members are formed in a straight band-like shape,
   wherein the barrier-members are formed so as to sandwich the heater from the both sides along with length direction.

3. The light source-unit according to claim 1,
   wherein the barrier-members have thickness larger than the thickness of the heater.

4. The light source-unit according to claim 2,
   wherein laser diode has a stripe electrode being formed in a straight band-like shape,
   wherein the heater and barrier-members are arranged on the joint surface along with the length direction of the stripe electrode.

5. The light source-unit according to claim 3,
   wherein the light source-unit further comprising:
   a joining metal layer made of joining metal,
   wherein the joining metal layer is formed so as to be in contact with the surface of the heater between the barrier-members.

6. The light source-unit according to claim 1,
   wherein the laser diode has an opposing-surface which opposes to the joint-surface,
   wherein the heater and barrier-members are arranged in a light-source area, of the joint-surface, which opposes to the opposing-surface.

7. The light source-unit according to claim 2,
   wherein the barrier-members have the same size, with a heater length along with the length direction of the heater, or the longer size than the heater length.

8. The light source-unit according to claim 1,
   wherein the barrier-members have flat upper-surfaces which are formed in a flat shape along with the joint-surface.

9. The light source-unit according to claim 1,
   wherein the joint-surface is formed with the lower thermal conductivity material.

10. A thermally assisted magnetic head comprising:
    a slider; and
    a light source-unit joined to the slider,
    wherein the light source-unit comprises a laser diode, a sub-mount which the laser diode is joined, and a heater which is joined on a joint surface, of the sub-mount, which the laser diode is joined;
    wherein the sub-mount comprises a pair of barrier-members,
    wherein the barrier-members are formed with lower thermal conductivity material which thermal conductivity is lower than a joining metal which is used for joining the laser diode and the sub-mount,
    wherein the barrier-members are formed on the joint surface so as to sandwich the heater.

11. The thermally assisted magnetic head according to claim 10,
    wherein the heater is formed in a straight band-like shape and the barrier-members are formed in a straight band-like shape,
    wherein the barrier-members are formed so as to sandwich the heater from the both sides along with length direction.

12. A head gimbal assembly comprising a thermally assisted magnetic head,
    wherein the thermally assisted magnetic head comprising:
    a slider; and
    a light source-unit joined to the slider,
    wherein the light source-unit comprises a laser diode, a sub-mount which the laser diode is joined, and a heater which is joined on a joint surface, of the sub-mount, which the laser diode is joined,
    wherein the sub-mount comprises a pair of barrier-members,
    wherein the barrier-members are formed with lower thermal conductivity material which thermal conductivity is lower than a joining metal which is used for joining the laser diode and the sub-mount,
    wherein the barrier-members are formed on the joint surface so as to sandwich the heater.

13. A hard disk drive comprising a head gimbal assembly having a thermally assisted magnetic head, and a magnetic recording medium opposing the thermally assisted magnetic head,
   wherein the thermally assisted magnetic head comprising:
   a slider; and
   a light source-unit joined to the slider,
   wherein the light source-unit comprises a laser diode, a sub-mount which the laser diode is joined; and a heater which is joined on a joint surface, of the sub-mount, which the laser diode is joined
   wherein the sub-mount comprises a pair of barrier-members,
   wherein the barrier-members are formed with lower thermal conductivity material which thermal conductivity is lower than a joining metal which is used for joining the laser diode and the sub-mount,
   wherein the barrier-members are formed on the joint surface so as to sandwich the heater.

* * * * *